US010535028B2

(12) United States Patent
Griswold et al.

(10) Patent No.: US 10,535,028 B2
(45) Date of Patent: Jan. 14, 2020

(54) REAL-TIME INTERACTIVE MODELING AND SIMULATION PROCESS FOR FACTORY LAYOUT

(71) Applicant: THE BOEING COMPANY, Chicago, IL (US)

(72) Inventors: Adam L. Griswold, Garden Grove, CA (US); Martin Haas, North Charleston, SC (US); David J. Hengy, Everett, WA (US); Benjamin H. Rothenberg, Huntington Beach, CA (US); Benjamin C. Thompson, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 472 days.

(21) Appl. No.: 15/043,218

(22) Filed: Feb. 12, 2016

(65) Prior Publication Data
US 2017/0235853 A1 Aug. 17, 2017

(51) Int. Cl.
*G06Q 10/06* (2012.01)
*G06F 17/50* (2006.01)

(52) U.S. Cl.
CPC ..... *G06Q 10/0633* (2013.01); *G06F 17/5009* (2013.01)

(58) Field of Classification Search
CPC . G06Q 10/0633; G06Q 10/06; G06F 17/5009
See application file for complete search history.

(56) References Cited

U.S. PATENT DOCUMENTS 6,615,671 B1 9/2003 Carstensen et al.
7,069,192 B1* 6/2006 Freitag .............. G06F 17/50
703/1

(Continued)

FOREIGN PATENT DOCUMENTS

DE 9309063 U1 8/1993

OTHER PUBLICATIONS

Silva, F., et al. "Product Lifecycle Management, Digital Factory and Virtual Commissioning: Analysis of these concepts as a new tool of lean thinking" Proceedings of 2015 Int'l Conf. on Industrial Engineering & Operations Management, pp. 911-915 (2015) (Year: 2015).*

(Continued)

*Primary Examiner* — Jay Hann
(74) *Attorney, Agent, or Firm* — Patterson + Sheridan, LLP

(57) ABSTRACT

Method, system, and computer program product for simulating the layout and flow of a manufacturing facility. An initial facility layout concept and a baseline input data set are received which define placement and movement of virtual objects within a virtual facility model. At least one of several analyses is performed based on the initial facility layout concept and the baseline input data set. An event flow analysis that outputs timing for movement of the objects from the initial positions may be performed. A geometric flow analysis that outputs interactions between the objects resulting from the movements from the initial positions may be performed. An ergonomic analysis that outputs human postures and motions resulting from interactions with objects may be performed. A simulated flow model for the manufacturing facility is generated. A three-dimensional virtual environment of the simulated flow model is generated and output for display.

20 Claims, 7 Drawing Sheets

(56) References Cited

U.S. PATENT DOCUMENTS

| | | | | |
|---|---|---|---|---|
| 8,762,111 | B2* | 6/2014 | Muller | G06F 17/5081 703/1 |
| 2006/0155402 | A1* | 7/2006 | Read | G06F 17/5018 700/97 |
| 2011/0172795 | A1* | 7/2011 | Hansen | G06F 17/5095 700/97 |
| 2017/0087722 | A1* | 3/2017 | Aberg | B25J 9/1676 |

OTHER PUBLICATIONS

Menck, N., et al. "Collaborative Factory Planning in Virtual Reality" 45th CIRP Conf. on Manufacturing Systems, pp. 317-322 (2012) (Year: 2012).*

Al-Zuheri, Atiya "Modelling and Optimisation of Walking Worker Assembly Line for Productivity and Ergonomics Improvement" Thesis, U. Southern Australia (2013) (Year: 2013).*

Wolfgang Kuhn Ed—Anonymous: "Digital Factory—Simulation Enhancing the Product and Production Engineering Process", Winter Simulation Conference, 2006. WSC 06. Proceedings of the, IEEE, PI, Dec. 1, 2006 (Dec. 1, 2006), pp. 1899-1906, XP031054892, ISBN: 978-1-4244-0500-8.

Francesco Caputo et al: "A Structured Approach to Simulate Manufacturing Systems in Virtual Environment," XVIII Congreso Internacional de Ingenieria Grafica, Barcelona, Spain, May 31-Jun. 2, May 31, 2006 (May 31, 2006), XP055215009, Retrieved from the Internet:RL:http://citeseerx.ist.psu.edu/viewdoc/download?doi=10.1.1.111.9646&rep=repl&type=pdf [retrieved on Sep. 21, 2015] p. 4-p. 12.

Ziyun Ding: "Manual Assembly Modelling and Simulation for Ergonomics Analysis," Nov. 1, 2013 (Nov. 1, 2013), pp. 1-206,XP055330135, Retrieved from the Internet: URL:http://repository.liv.ac.uk/14493/1/DingZiy Nov201314493.pdf [retrieved on—Dec. 19, 2016].

Anonymous: "Workplace Planner Help",Jan. 1, 2013 (Jan. 1, 2013), XP055387793,Retrieved from the Internet: URL: htttps://www.plm.automation.siemens.com/en gb/Images/7457 tcm642-80351.pdf [retrieved on Jul. 4, 2017].

Anonymous: "Process Simulate", Jan. 1, 2011 (Jan. 1, 2011), XP055387798,Retrieved from the Internet: URL:http://studylib.net/doc/10582099/workplace-planner-help-%C2%A9-2013-proplanner [retrieved on Jul. 4, 2017] p. 1-p. 3.

Alessandra Caggiano et al: "Digital Factory Approach for Flexible and Efficient Manufacturing Systems in the Aerospace Industry", Procedia CI RP, vol. 37, Jan. 1, 2015 (Jan. 1, 2015), pp. 122-127, XP055389959, NL ISSN: 2212-8271, DOI:10.1016/j.procir.2015.08.015.

Chemin A EA et al: "Effect of saline corrosion environment on fatigue crack growth of 7475-T7351 aluminum alloy under TWIST flight loading", Engineering Fracture Mechanics, vol. 141, May 27, 2015 (May 27, 2015), pp. 274-290.

Extended European Search Report dated Dec. 19, 2016 for Application No. 16183323.1-1559.

European Search Report for Application No. 17155126.0-1954/3206144 dated Jul. 27, 2017.

* cited by examiner

REAL-TIME INTERACTIVE MODELING AND SIMULATION PROCESS FOR FACTORY LAYOUT

BACKGROUND

Aspects described herein relate to planning a layout and flow of a manufacturing facility, and more specifically, to generating a simulated flow of objects in a three-dimensional virtual environment of the manufacturing facility that allows different stakeholders to evaluate the suitability of the simulated flow for use in the actual manufacturing facility.

SUMMARY

According to one aspect, a method for simulating a layout and flow of a manufacturing facility is provided. The method includes receiving an initial facility layout concept. The initial facility layout concept includes three-dimensional models of a plurality of objects in a virtual facility model and initial positions of the plurality of objects in the virtual facility model. The method also includes receiving a baseline input data set for the plurality of objects in the manufacturing facility. The method also includes performing at least one of the following based on the initial facility layout concept and the baseline input data set: an event flow analysis that outputs timing for movement of the plurality of objects from the initial positions according to an event flow analysis application; a geometric flow analysis that outputs interactions between the plurality of objects resulting from the movements from the initial positions according to a geometric flow analysis application; and an ergonomic analysis that outputs human postures and motions resulting from interactions of human objects with other objects from among the plurality of objects according to an ergonomic analysis application. The method also includes generating a simulated flow model for the manufacturing facility based on the initial facility layout concept and the at least one of the event flow analysis, the geometric flow analysis, and the ergonomic analysis. The method also includes generating a three-dimensional virtual environment of the simulated flow model. The method also includes displaying the three-dimensional virtual environment on a computer display screen.

According to one aspect, a computer program product for simulating a layout and flow of a manufacturing facility is provided. The computer program product includes a computer-readable storage medium having computer-readable program code embodied therewith. The computer-readable program code is executable by one or more computer processors to receive an initial facility layout concept. The initial facility layout concept includes three-dimensional models of a plurality of objects in a virtual facility model and initial positions of the plurality of objects in the virtual facility model. The computer-readable program code is also executable to receive a baseline input data set for the plurality of objects in the virtual facility model. The computer-readable program code is also executable to perform at least one of the following based on at least one of the initial facility layout concept and the baseline input data set: an event flow analysis that outputs timing for movement of the plurality of objects from the initial positions according to an event flow analysis application; a geometric flow analysis that outputs interactions between the plurality of objects resulting from the movements from the initial positions according to a geometric flow analysis application; and an ergonomic analysis that outputs human postures and motions resulting from interactions of human objects with other objects from among the plurality of objects according to an ergonomic analysis application. The computer-readable program code is also executable to generate a simulated flow model for the manufacturing facility based on the initial facility layout concept and the at least one of the event flow analysis, the geometric flow analysis, and the ergonomic analysis. The computer-readable program code is also executable to generate a three-dimensional virtual environment of the simulated flow model. The computer-readable program code is also executable to display the three-dimensional virtual environment on a computer display screen.

According to one aspect, a system includes a computer processor and a display screen. The system also includes computer memory storing an initial facility layout concept. The initial facility layout concept includes three-dimensional models of a plurality of objects in a virtual facility model and initial positions of the plurality of objects in the virtual facility model. The computer memory also stores a baseline input data set for the plurality of objects in the virtual facility model. The computer memory also stores an event flow analysis application that, when executed by the computer processor, outputs an event flow analysis that includes timing for movement of the plurality of objects from the initial positions. The computer memory also stores a geometric flow analysis application that, when executed by the computer processor, outputs a geometric flow analysis that includes interactions between the plurality of objects from the initial positions. The computer memory also stores an ergonomic analysis application that, when executed by the computer processor, outputs an ergonomic analysis that includes human postures and motions resulting from interactions of human objects with other objects from among the plurality of objects. The computer memory also stores a three-dimensional visual application that, when executed by the computer processor: generates a simulated flow model for the manufacturing facility based on the initial facility layout concept and at least one of an event flow analysis, a geometric flow analysis, and an ergonomic analysis; and outputs to the display screen a three-dimensional virtual environment of the simulated flow model.

DETAILED DESCRIPTION

Figure 1:
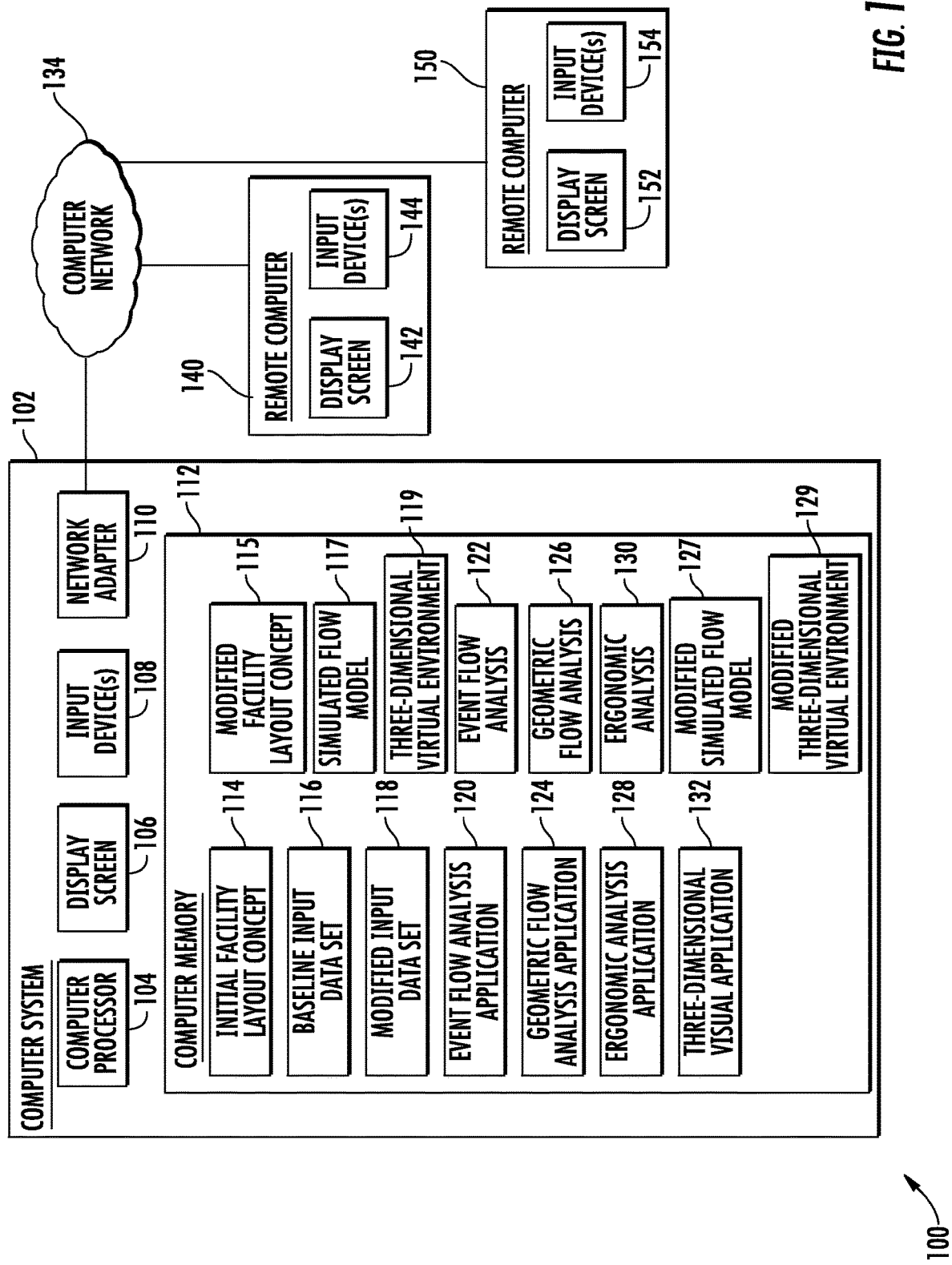
FIG. 1 is a block diagram of a system for simulating the layout and flow of a manufacturing facility.

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

Manufacturing sites, such as commercial aircraft manufacturing facilities, typically follow a flow (i.e., a scheduled movement of workpieces, tooling, and people) to produce goods. Optimizing the flow requires significant planning and coordination. To identify a layout and flow of activities in a manufacturing facility, various stakeholders (i.e., personnel with experience with different aspects of the manufacturing process, such as ergonomics and tooling requirements, responsible for ensuring the flow in the manufacturing facility meets requirements of the various aspects) are often brought together for large-scale meetings to iteratively design the layout and flow of activities in the manufacturing site. For example, an ergonomics stakeholder may point out that a work platform is too high for a particular worker standing on the work platform, who is consequently forced to bend down or kneel down for long periods of time to perform a task. As a result of that stakeholder's input, a height of the work platform may be lowered. However, a tooling stakeholder may then recognize that the lowered work platform blocks a travel path for a power supply cart, for example. As a result, the power supply cart may have to be moved into place before the work platform is lowered or the power supply cart may have to wait to be moved into place until after the work being performed on the work platform is complete. These exemplary scenarios illustrate simple circumstances that require changes to a planned flow in a manufacturing facility that such planning meetings address. However, such planning meetings are typically expensive because many of the required individuals must travel and/or significantly reconfigure their work schedules to attend such meetings. In addition, in certain circumstances, such planning may require several meetings over an extended period of time to allow personnel to study issues or get answers to questions that may arise during the planning meetings.

In aspects described herein, a computer system generates a simulated flow in a three-dimensional virtual environment of a manufacturing facility. The computer system stores three-dimensional models of various objects, such as workpieces, tooling, and personnel operating within the facility. The computer system also stores an input data set that defines when and how the various objects move in the facility. The three-dimensional models can be operated, in accordance with the input data set, in a three-dimensional virtual environment that different people can view from different computer workstations. Additionally, the three-dimensional virtual environment could enable different stakeholders using the computer system to virtually move their point of view within the three-dimensional virtual environment such that they can focus on aspects of the facility plan pertinent to their individual experience. As a result, planning meetings for a manufacturing facility can be conducted remotely and, in some instances, in a time delayed manner, meaning that the stakeholders providing input for a proposed flow can review the proposed flow at a time of their own choosing and on their own computer.

FIG. 1 is a block diagram of a computer environment 100 for providing a simulated flow in a manufacturing facility. The computer environment includes a computer system 102 and remote computers 140 and 150 connected to the computer system 102 by a computer network 134. The computer system 102 includes a computer processor 104 and computer memory 112. The computer system 102 also includes a display screen 106 and an input device(s) 108. The computer system 102 also includes a network adapter 110 that enables communication with the computer network 134 and the remote computers 140 and 150.

The computer memory 112 of the computer system 102 stores various data structures and also stores various applications that are executable on the computer processor 104. The computer system 102 stores an initial facility layout concept 114 that includes three-dimensional models of various objects and initial positions of the various objects. Examples of the various objects include workpieces (e.g., aircraft parts being assembled), tooling (e.g., elevated platforms, staircases, and support carts), and personnel (e.g., workers operating on the workpieces and with the tooling). The three-dimensional models of the various objects can include modeling of articulation of various components of the objects. For example, a model for an elevated platform could include the platform in a lowered position, and elevated position, and/or one or more intermediate positions between the lowered position and the elevated position. As another example, a model of a person could include articulation of the person's legs, arms, torso, and head. In various aspects, the initial facility layout concept 114 can also include safety zones around certain objects, such as human objects or delicate objects. For example, safety zones could be provisioned around the human objects to act as virtual outer dimensions of the human object such that any other virtual object breaching the safety zone would be treated as a collision.

The computer system 102 also stores a baseline input data set 116. The baseline input data set 116 defines when and how the various objects move within the virtual layout of the manufacturing facility. For example, the baseline input data set 116 defines when objects move, where they move to, and how fast the objects move. For example, with respect to an elevated work platform, the baseline input data set 116 could define movement of the elevated work platform from a parked or storage position to a position alongside an aircraft. The movement definitions for the elevated work platform could include a minimum speed of movement, a maximum speed of movement, and a speed at which the elevated work platform can be raised and/or lowered. As another example, the baseline input data set 116 could define movements of virtual humans within the virtual facility. For example, the baseline input data set 116 could include an average walking pace, average speeds of arm movements, etc. As another example, the baseline input data set 116 could include various postures that the virtual human objects can assume (e.g., standing, reaching overhead, bending down, and sitting). In various aspects, the baseline input data set 116 could include default postures for locations of different tasks to be performed by the virtual human objects. For example, if a particular work task to be performed at a location less than a foot from a surface on which a virtual human object is standing, then the virtual human object could be automatically placed in a bent over posture.

In various aspects, the baseline input data set 116 includes all movements of the various objects from the time the various objects are in the initial positions indicated in the initial facility layout concept 114 to a time in which the various objects are returned to the initial positions (or, in the event of workpieces, is moved out of the facility being modeled). For example, consider scenario in which the computer system 102 is modeling a portion of a manufacturing facility in which a wing is attached to a fuselage of an aircraft. In this scenario, the fuselage section moves along an assembly line and an initial position is located at an adjacent upstream station of the assembly line and a final position is located at an adjacent downstream station of the assembly line. Likewise, the wing may move from an initial location at a wing assembly station to a position alongside the fuselage and then, after the wing is attached to the fuselage, have a final position located at the adjacent downstream station of the assembly line. Various tools, such as elevated work platforms, ground support equipment, and the like, may have respective initial positions that are out of the way of the moving fuselage and wing. The various tools may move to respective intermediate positions alongside the fuselage and wings for use during assembly of the wing and fuselage. Certain tools may have multiple intermediate positions during assembly of the wing and fuselage (e.g., a particular tool, such as an elevated work platform, could be moved during the assembly of the wing and fuselage to provide access to different portions of the wing and/or fuselage). After assembly of the wing and fuselage is complete, the tools may be returned to the respective initial positions. Additionally, human workers may move from initial positions (e.g., a locker room) to positions relative to the workpieces and/or the tooling during movement of the workpieces, during movement of the tooling, and during assembly of the wing and fuselage. For example, certain human workers may be involved in moving fuselage along the assembly line and certain other human workers may be involved in moving the wing to the fuselage. Also, additional human workers may be involved in moving the tooling from the initial positions to positions alongside the fuselage and the wing. Human workers then may move along the fuselage, the wing, and certain tooling to perform tasks on the fuselage and wing (e.g., installing rivets, measuring clearances, and installing fasteners). The various human workers may move to various different locations to perform different tasks. After all of the tasks are completed, the human workers may be involved in moving the tooling back to the initial positions and in moving the assembled fuselage and wing to the next station of the assembly. The baseline input data set 116 defines all of the movements for the various virtual objects (e.g., workpieces, tooling, and human workers) in the above-described flow to assemble the wing and the fuselage. The baseline input data set 116 can define estimated durations for the various movements as well as durations for the various tasks to be performed by the human workers).

In various aspects, the baseline input data set 116 can also include an ordering of movements and/or work tasks. For example, a particular piece of tooling, such as elevated work platform, has to be moved in place next to the fuselage and/or the wing before a human worker can stand on the elevated work platform to install rivets in the fuselage and/or wing. As another example, the elevated work platform may not be moved in place next to the fuselage and/or wing until a particular ground support cart has been moved in place under the fuselage. The ordering in the baseline input data set 116 can define which movements and/or tasks are completed first, second, third, etc.

In various aspects, the baseline input data set 116 may include ranges of times for various movements and/or for various tasks, reflecting variations that may occur (e.g., due to a tooling malfunction). For example, human workers may, on average, be able to use a particular rivet gun to install ten rivets per minute. Thus, a task to install one hundred rivets would typically take 10 minutes. However, some human workers may be able to work faster or slower than the average speed. Additionally, it may be the case that a percentage of rivets (e.g., 5% of the rivets) do not form correctly and therefore must be removed so that a new rivet can be installed. The baseline input data set 116 can include a range of times that reflect a possible range of times for various tasks and probabilities associated with various portions of the ranges. Continuing the example above, the exemplary baseline input data set 116 could indicate that there is a 95% chance that the rivet task will be completed in a time between nine minutes and 11 minutes, a 97% chance that the rivet task will be completed in a time between eight minutes and 12 minutes, and a 99% chance of the rivet task will be completed in a time between seven minutes and 13 minutes.

As will be discussed in greater detail below, the initial facility layout concept 114 and/or the baseline input data set 116 can be modified to result in a modified facility layout concept 115 and/or a modified input data set 118, respectively. The modified facility layout concept 115 and/or the modified input data set 118 incorporate changes to the initial facility layout concept 114 and/or to the baseline input data set 116, respectively. The changes can be made automatically based on various analyses provided by various applications, discussed below, as well as inputs received from various users (e.g., using the input devices 108, 144, or 154).

As discussed above, the computer memory 112 stores various applications. For example, the computer memory 112 stores an event flow analysis application 120 that, when executed on the computer processor 104, outputs an event flow analysis 122. The event flow analysis 122 is stored in the computer memory 112. To produce the event flow analysis 122, the event flow analysis application 120 operates on the initial facility layout concept 114 and the baseline input data set 116 (and/or the modified facility layout concept 115 and/or the modified input data set 118) to determine a length of time required to perform the various motions and tasks defined in the baseline input data set 116 and/or the modified input data set 118. The event flow analysis application 120 can account for statistical likelihoods and/or ordering of movements and tasks to determine the length of time and the confidence level for the length of time. For example, the event flow analysis application 120 may determine that a particular simulated flow should be completed in three hours with a 95% confidence interval, within three and a half hours with 97% confidence interval, and within four hours with a 99% confidence interval.

The computer memory 112 also stores a geometric flow analysis application 124 that, when executed on the computer processor 104, outputs a geometric flow analysis 126. The geometric flow analysis 126 is stored in the computer memory 112. To produce the geometric flow analysis 126, the geometric flow analysis application 124 operates on the event flow analysis 122 and the three-dimensional models of the various objects in the initial facility layout concept 114 to identify proximities of various objects to each other. For example, according to the initial facility layout concept 114 in the baseline input data set 116, the geometric flow analysis application 124 may determine that a first object and a second object would collide or would be too close for safety purposes. For objects encompassed by a safety zone, a collision could occur whenever the safety zone is breached by another object. For example, a human object may have a safety zone of one meter extending in all directions from the human object to provide a suitable separation between the human object and any moving machinery. In the event any other object breaches the safety zone, such a breach could be treated as a collision that must be corrected.

The computer memory 112 also stores an ergonomic analysis application 128 that, when executed on the computer processor 104, outputs an ergonomic analysis 130. The ergonomic analysis 130 is stored in the computer memory 112. The ergonomic analysis application 128 operates on the initial facility layout concept 114, the baseline input data set 116 (and/or the modified facility layout concept 115 and/or the modified input data set 118), the event flow analysis 122, and the geometric flow analysis 126 to identify ergonomic issues with human objects in the virtual environment. For example, a first human object in the virtual environment may be placed on an elevated work platform to perform a task on a workpiece at approximately eye level. As a result, the first human object may assume a standing position to perform the task on the workpiece. Another human object in the virtual environment may be placed on the elevated work platform to perform a task on the workpiece at approximately foot level. As a result, the second human object may assume a crouching position or a bent over position to perform the task on the workpiece. The ergonomic analysis application 128 could assign a posture (e.g., standing, sitting, crouching, or bending over) to each human object based on the task being performed. The ergonomic analysis 130 could include an ergonomic suitability metric (e.g., a score) for the different postures. For example, standing and working at approximately eye level may receive a good score whereas bending over to work at foot level may receive a bad score.

In various aspects, the ergonomic analysis 130 could include an ideal human height for a particular task. For example, consider a scenario in which a particular task is to be performed on an elevated work platform. In this particular scenario, the ergonomic analysis 130 could indicate that a human object that is five feet and nine inches tall would perform the particular task at eye level while standing on the elevated platform. Such a posture (standing and working at eye level) could be a preferred posture. If the event the ergonomic analysis 130 indicates that a human object has to be seven feet tall to perform the particular task at eye level while standing on the platform or that the human object has to be four feet tall to perform the particular task at eye level while standing on the platform, such an indication could serve as an alert that a parameter in the flow model needs to be changed because it is unlikely that any actual workers could be able to perform the task according to plan in an ergonomic manner. For example, if the ergonomic analysis 130 indicates that a human object has to be seven feet tall to perform the particular task at eye level while standing on the elevated work platform, then the input data set may need to be modified to raise the height of the elevated work platform so that a human object closer to an average height could perform the task at eye level while standing on the platform. Similarly, if the ergonomic analysis 130 indicates that a human object has to be four feet tall to perform the particular task at eye level while standing on the elevated work platform, then the input data set may need to be modified to lower the height of the elevated work platform so that a human object closer to an average height could perform the task at eye level while standing on the platform. In various aspects, the ideal human height for performing a particular task in an ergonomic manner could be expressed as a statistical value based on a mean height and standard deviations from the mean height. For example, the height of a human object could be expressed as a number of standard deviations away from a mean height. If a particular task uses a human object that is more than a predetermined number of standard deviations away from a mean height, then the ergonomic analysis could include an alert for that particular task.

The computer memory 112 also stores a three-dimensional visual application 132 that, when executed on the computer processor 104, generates a simulated flow model 117 for the manufacturing facility based on the initial facility layout concept 114 (and/or the modified facility layout concept 115), the baseline input data set 116 (and/or the modified input data set 118), and at least one of the event flow analysis 122, the geometric flow analysis 126, and the ergonomic analysis 130. The three-dimensional visual application 132 then generates a three-dimensional virtual environment 119 of the simulated flow model 117 and outputs the generated three-dimensional virtual environment 119 of the simulated flow for display. An example of the three-dimensional visual application 132 is created using the Unity 5 three-dimensional game development environment, a commercial off-the-shelf (COTS) product from Unity Technologies, Inc. For example, the three-dimensional visual application 132 can place the various objects in initial locations in a virtual facility model in accordance with the initial facility layout concept 114. Thereafter, the three-dimensional visual application 132 can move the various objects in accordance with the baseline input data set 116, the event flow analysis 122, the geometric analysis 126, and the ergonomic analysis 130. The three-dimensional visual application 132 can illustrate workpieces and tooling, such as elevated work platforms, being moved and articulated (i.e., elevating a work platform). The three-dimensional visual application 132 can also illustrate human objects interacting with the work pieces and the tooling. The displayed three-dimensional virtual environment can illustrate any collisions and/or any ergonomic issues. In certain aspects, the three-dimensional visual application 132 could merely show such collisions and/or ergonomic issues (e.g., a human object bending over to perform a task). In certain other aspects, the three-dimensional visual application 132 could highlight or otherwise draw attention to any collisions and/or ergonomic issues.

The three-dimensional visual application 132 can display the three-dimensional virtual environment from any position and direction of view. For example, a user could provide inputs using the input device(s) 108 to change a position and direction of view within the three-dimensional virtual environment. For example, the input device(s) 108 could include a computer keyboard and a computer mouse. A user could use the cursor keys on the keyboard to move a position of view and could use the computer mouse to change a direction of view. As another example, the input device(s) 108 could include a gaming controller with dual analog joysticks. The user could use a first of the analog joysticks to move about the virtual environment and could use the other joystick to change the direction of view.

In various aspects, the three-dimensional visual application 132 can operate on different computer platforms. For example, the three-dimensional visual application 132 could run inside a web browser (i.e., as an add-on or extension to a web browser), such as Internet Explorer®, Mozilla Firefox®, Google Chrome®, and/or Apple Safari®. The web browser could transmit inputs received from the input device(s) 108 to the three-dimensional visual application 132, and the three-dimensional visual application 132 could output for display on the web browser an image or images of the three-dimensional virtual environment from the position and direction of view indicated by the received inputs.

In various aspects, the three-dimensional visual application 132 can operate over a computer network via the network adapter 110 and a computer network 134. For example, in instances in which the three-dimensional visual application 132 operates inside a web browser, discussed above, remote computers 140 and 150 could access the three-dimensional visual application 132 via the computer network 134 and the network adapter 110 in the computer system 102. The remote computers 140 and 150 could send inputs to the three-dimensional visual application 132 using input devices 144 and 154, respectively, to indicate positions and directions of view for display on display screens 142 and 152, respectively. The three-dimensional visual application 132 could process the inputs and generate displays of the virtual three-dimensional environment from the indicated positions and directions of view. The three-dimensional visual application 132 could then output for display the different views of the virtual three-dimensional environment. The computer system 102 could transmit the different views of the virtual three-dimensional environment to the remote computers 140 and 150 for display on the display screens 142 and 152, respectively.

In various aspects, the three-dimensional visual application 132 can display the same simulated flow model 117 in the three-dimensional virtual environment 119 at the same time on the different display screens 106, 142, and 152. For example, in one exemplary scenario, three stakeholders could be communicating with each other using a telephone conference. A first stakeholder could be using the computer system 102 and the remaining two stakeholders could be using the remote computers 140 and 150. Other stakeholders could be using additional remote computers. The three-dimensional visual application 132 could output the different views of the simulated flow model 117 in the three-dimensional virtual environment 119 to the display screens 106, 142, and 152 so that the displays of the simulated flow model 117 are synchronized or nearly synchronized. For example, the stakeholder using the computer system 102 could use the input device(s) 108 to start and stop the simulated flow, and such starting and stopping would be reflected on the displayed simulated flows on the display screens 142 and 152 of the respective remote computers 140 and 150.

Figure 2:
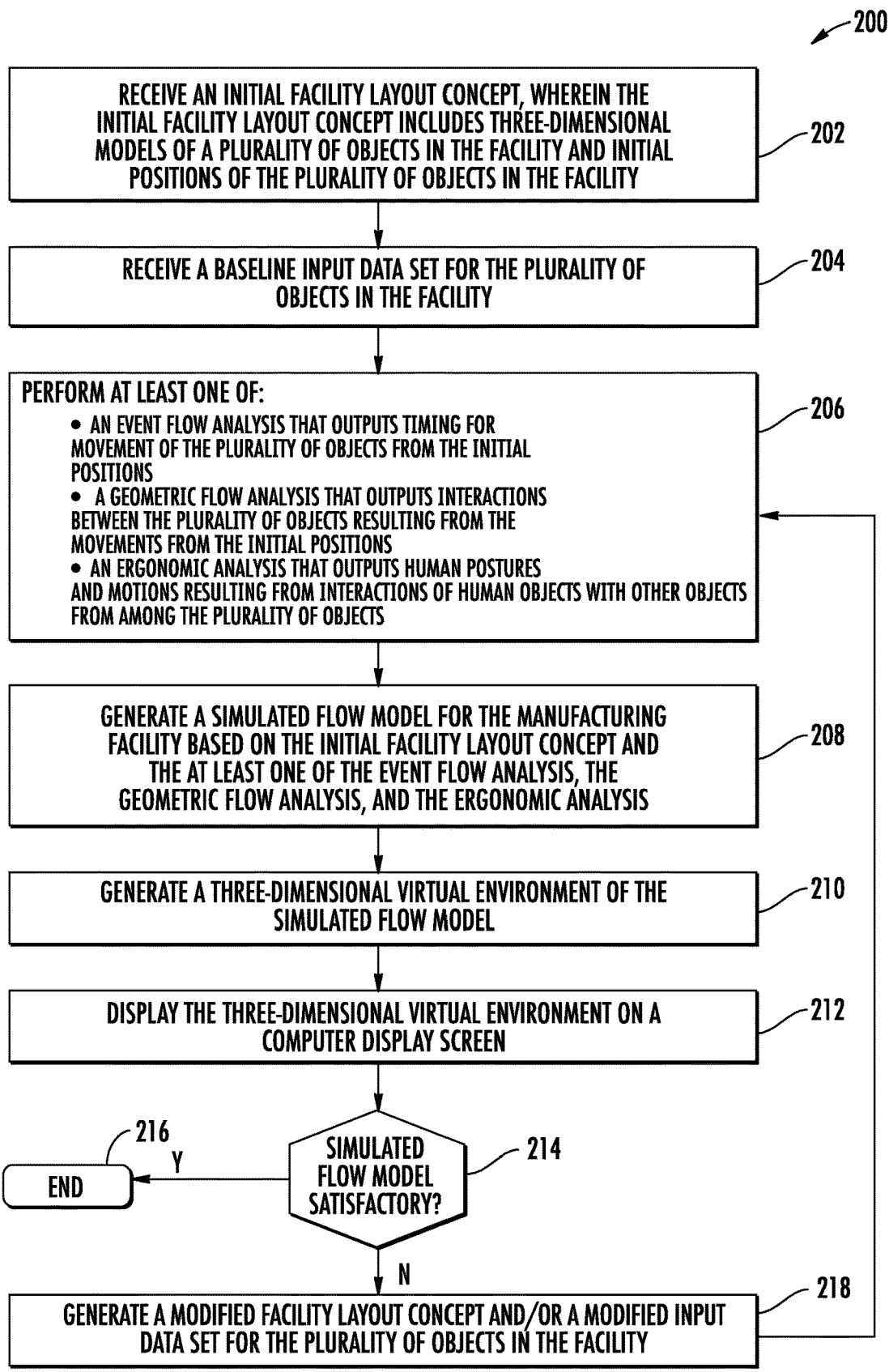
FIG. 2 is a flow chart of a method for simulating the layout and flow of a manufacturing facility.

FIG. 2 is a flowchart for a method 200 for simulating the layout and flow of a manufacturing facility. In block 202, and initial facility layout concept is received. The initial facility layout concept includes three-dimensional models of a plurality of objects in a facility and initial positions of the plurality of objects in the facility. In block 204, a baseline input data set for the plurality of objects in the facility is received. The baseline input data set describes when and how the plurality of objects move from the initial positions indicated in the initial facility layout concept. In block 206, at least one of several analyses is performed. For example, an event flow analysis may be performed that outputs timing for movement of the plurality of objects from the initial positions. For example, the event flow analysis may indicate that a first object moves immediately from an initial position at a speed of 2 mph and that a second object stays in its initial position for three minutes before moving at a speed of 5 mph. The event flow analysis may result in an expected time for a simulated flow to be completed. As another example, a geometric flow analysis may be performed that outputs interactions between the plurality of objects resulting from the movements from the initial positions. For example, the geometric flow analysis may indicate that a first object and a second object will collide if moved in accordance with the baseline input data set. As another example, the ergonomic analysis may be performed that outputs human postures and motions resulting from interactions with objects from among the plurality of objects. For example, the ergonomic analysis may indicate that a first human object must bend over to perform a particular task and that a second human object is standing to perform a particular task. The ergonomic analysis could include a score for the respective postures. For example, the bent over posture of the first human object may be scored lower than the standing posture of the second human object.

In block 208 of the method 200, a simulated flow model 117 for the manufacturing facility is generated based on the initial facility layout concept and the at least one of the event flow analysis, the geometric flow analysis, and the ergonomic analysis. In the simulated flow model 117, the plurality of objects move from the initial positions, indicated by the initial facility layout concept, in directions and speeds indicated by the baseline input data set. The simulated flow model 117 includes any collisions indicated by the geometric flow analysis and any ergonomic issues indicated by the ergonomic analysis. In block 210, a three-dimensional virtual environment 119 of the simulated flow model 117 is generated. As discussed above, a three-dimensional visual application, such as a three-dimensional visual application produced using the Unity 5 three-dimensional game development environment, can generate a three-dimensional virtual environment 119 of the simulated flow model 117. In block 212, the three-dimensional virtual environment 119 is displayed on a computer display screen.

In block 214 of the method 200, a decision is made as to whether the simulated flow model 117 is satisfactory. In a least one aspect, the simulated flow model 117 is satisfactory if there are no collisions or conflicts between objects and if the human objects in the simulated flow model 117 assumes acceptable postures to perform the various tasks. In at least one aspect, the simulated flow model 117 is satisfactory if the duration of the simulated flow is below a threshold amount of time. In the event the simulated flow model 117 is satisfactory, then the method 200 ends at block 216.

In the event the simulated flow model 117 is not satisfactory, then the method 200 proceeds to block 218 to generate a modified facility layout concept 115 and/or a modified input data set 118 for the plurality of objects in the facility. In various aspects, a computer processor, such as the computer processor 104 in FIG. 1, could automatically generate at least portions of the modified input data set 118 in block 218. For example, in the event that two objects collide in the simulated flow model, the computer processor 104 could automatically adjust a value in the baseline input data set 116 for the modified input data set 118. For example, the computer processor 104 could delay movement of one of the two objects or could slow one of the two objects to eliminate the collision. Alternatively or in addition, the computer processor 104 could move the initial position of one of the two objects in the initial facility layout concept 114 (thereby creating the modified facility layout concept 115) to eliminate the collision. As another example, in the event an elevated work platform is positioned too high such that a human object standing on the elevated platform must bend over to perform a task, the computer processor 104 could adjust a height of the elevated work platform in the modified input data set 118 such that the human object assumes a standing posture to perform the task.

In various aspects, a computer processor, such as the computer processor 104, may not be able to automatically eliminate conflicts and/or human posture issues. In such instances, the stakeholders may view the displayed three-dimensional virtual environment on the computer display screens 106, 142, and 152. Thereafter, the stakeholders could provide inputs via the input devices 108, 144, and 154 to modify items in the baseline input data set for the modified input data set. For example, the base baseline input data set 116 may have two human objects that are located on an elevated work platform, wherein the first human object is assuming a standing posture to perform tasks and the second human object is assuming a bent over posture to perform tasks. A stakeholder (e.g., an ergonomics expert) may view the three-dimensional virtual environment of the simulated flow model and identify the bent over posture of the second human object as undesirable. Consequently, the stakeholder could use the input device(s) on the computer system 102 or one of the remote computers 140 and 150 to provide a modified input data set 118 that: removes the second human object from the elevated work platform; has the first human object perform the first task; lowers the elevated work platform to a lower level; and then has the first human object perform the task that was performed by the second human object.

After the modified facility layout concept 115 and/or the modified input data set 118 is generated in block 218, the method 200 returns to block 206 such that the at least one analysis is performed based on the initial facility layout concept (or the modified facility layout concept) and the baseline input data set (or the modified input data set). Blocks 206, 208, 210, and 212 are repeated in an iterative fashion until the simulated flow model is satisfactory in block 214.

Figure 3A:
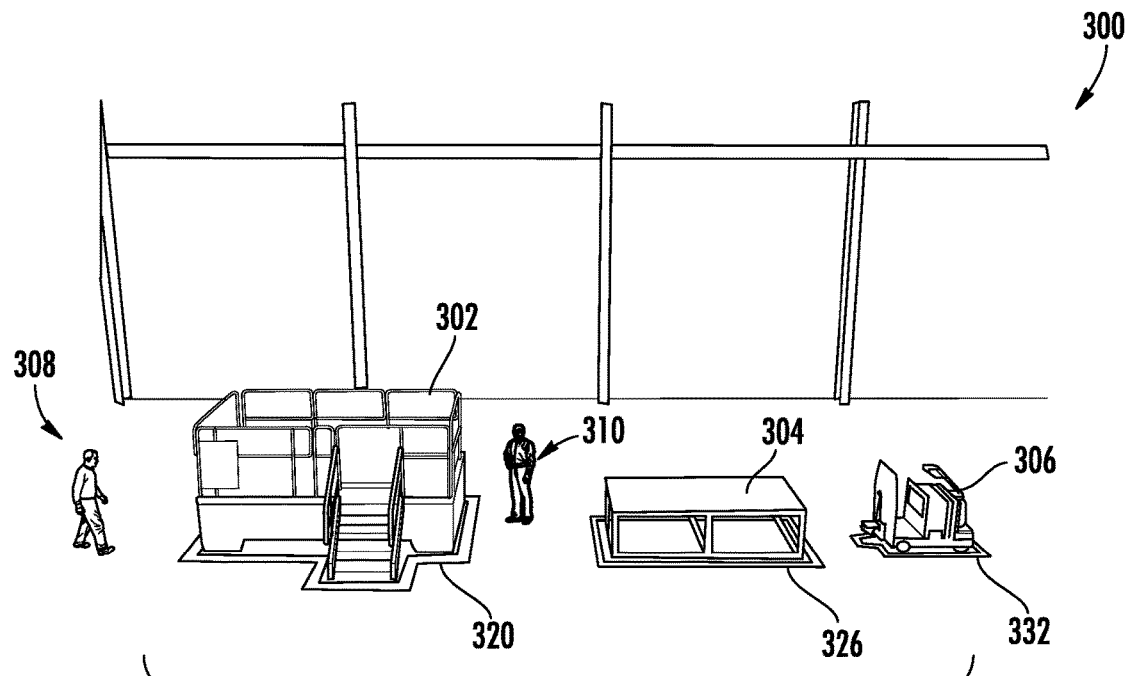
FIG. 3A is a perspective view of a depiction of an exemplary scenario in a three-dimensional virtual environment in which a plurality of objects are arranged in accordance with an initial facility layout concept.
Figure 3B:
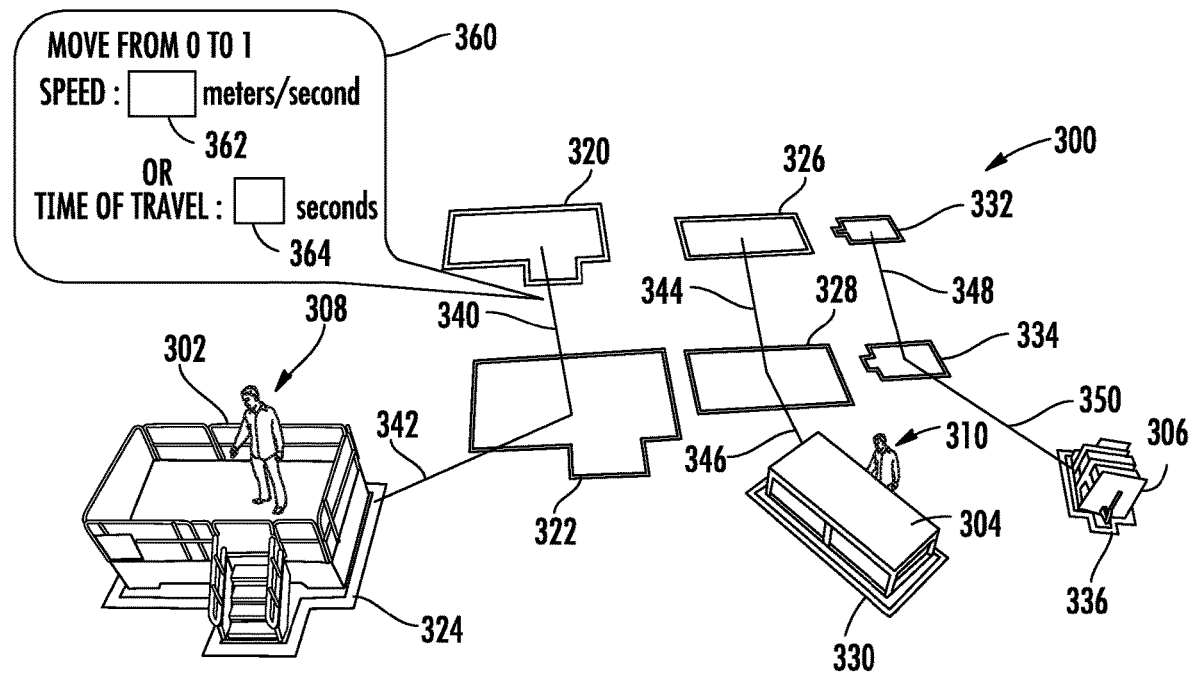
FIG. 3B is a perspective view of a depiction of the an exemplary scenario in the three-dimensional virtual environment of FIG. 3A, wherein certain ones of the plurality of objects have moved from arrangement in accordance with the initial facility layout concept to first positions and then second positions, based on a first baseline input data set, and wherein the depiction includes a text box that enables a user to enter user selections for a modified input data set.

FIGS. 3A and 3B illustrate operation of an initial facility layout concept and a baseline input data set in a three-dimensional virtual environment 300. In this exemplary scenario, the initial facility layout concept defines five objects in the three-dimensional virtual environment 300. FIG. 3A illustrates the five objects as including an elevated work platform 302 at a first initial position 320, a worktable 304 at a second initial position 326, a motorized cart 306 at a third initial position, and two human objects 308 and 310. The human objects 308 and 310 may not have initial positions to reflect the random or unknowable actual positioning of humans in a workplace.

In FIG. 3B, the five objects are shown to have moved in accordance with a baseline input data set (e.g., the baseline input data set 116 in FIG. 1). For example, the elevated work platform 302 moved from the first initial position 320 along a first path 340 to a first intermediate position 322 and then along the second path 342 to a first final position 324. A first human object 308 is shown on the elevated work platform 302 in the first final position 324. As another example, the worktable 304 moved from the second initial position 326 along a third path 344 two a second intermediate position 328 and then along a fourth path 346 to a second final position 330. A second human object 310 is shown alongside the worktable 304 in the second final position 330. As another example, the motorized cart 306 moved from the third initial position 332 along a fifth path 348 to a third intermediate position 334 and then along a sixth path 352 a third final position 336. FIG. 3B illustrates a graphical user interface 360 arranged on the display of the three-dimensional virtual environment 300 that can be used by a stakeholder to change parameters of the initial facility layout concept 114 and/or the baseline input data set 116. In the exemplary scenario, the graphical user interface 360 is pointing to the first path 340, indicating that the displayed graphical user interface 360 can be used to adjust aspects of movement of the elevated work platform 302 from the first initial position 320 to the first intermediate position 322. The graphical user interface 360 includes a first text box 362 in which the user could enter a speed of movement along the first path 340. The graphical user interface 360 also includes a second text box 364 in which the stakeholder could enter a time of travel from the first initial position 320 to the first intermediate position 322 along the first path 340. The graphical user interface 360 could also include inputs to enable the stakeholder to delay movement of the elevated work platform 302 relative to other objects (e.g., the worktable 304 and/or the motorized cart 306). The stakeholder may also be able to adjust initial positions of the various objects. For example, a stakeholder could use an input device, such as a computer mouse, to move one or more of the objects. For example, referring again to FIG. 3A, the stakeholder could select the elevated work platform 302 with the computer mouse and drag the elevated work platform 302 in the virtual environment 300 to a new initial position.

Figure 4A:
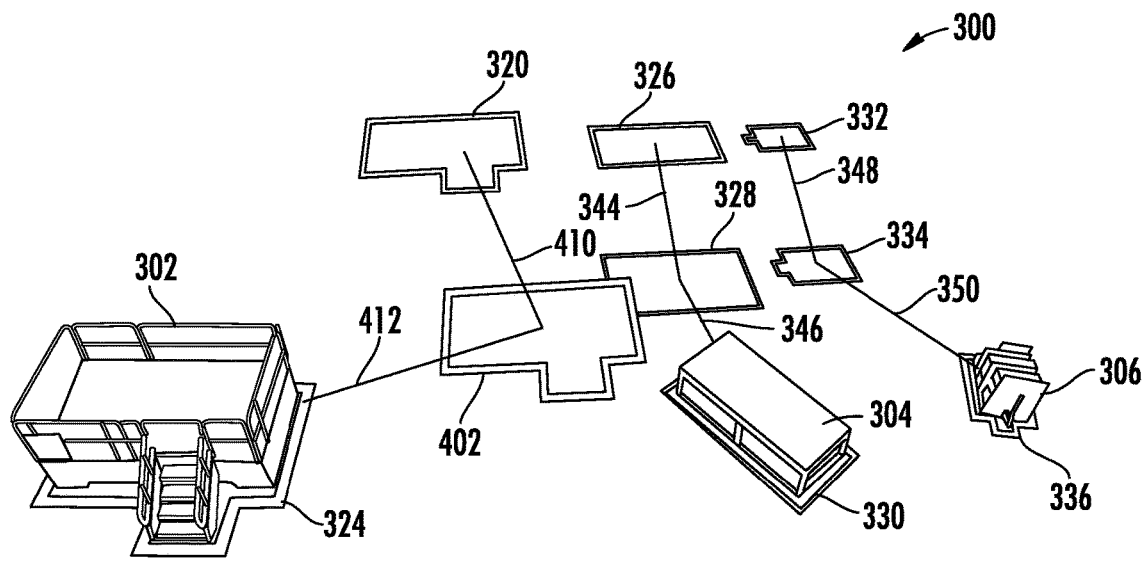
FIG. 4A is a perspective view of an exemplary scenario in a depiction of an exemplary scenario in the three-dimensional virtual environment 3A, wherein certain ones of the plurality of objects have moved from initial positions in accordance with the initial facility layout concept to first positions and then second positions, based on a second baseline input data set, wherein two of the objects would occupy the same space at the same time.
Figure 4B:
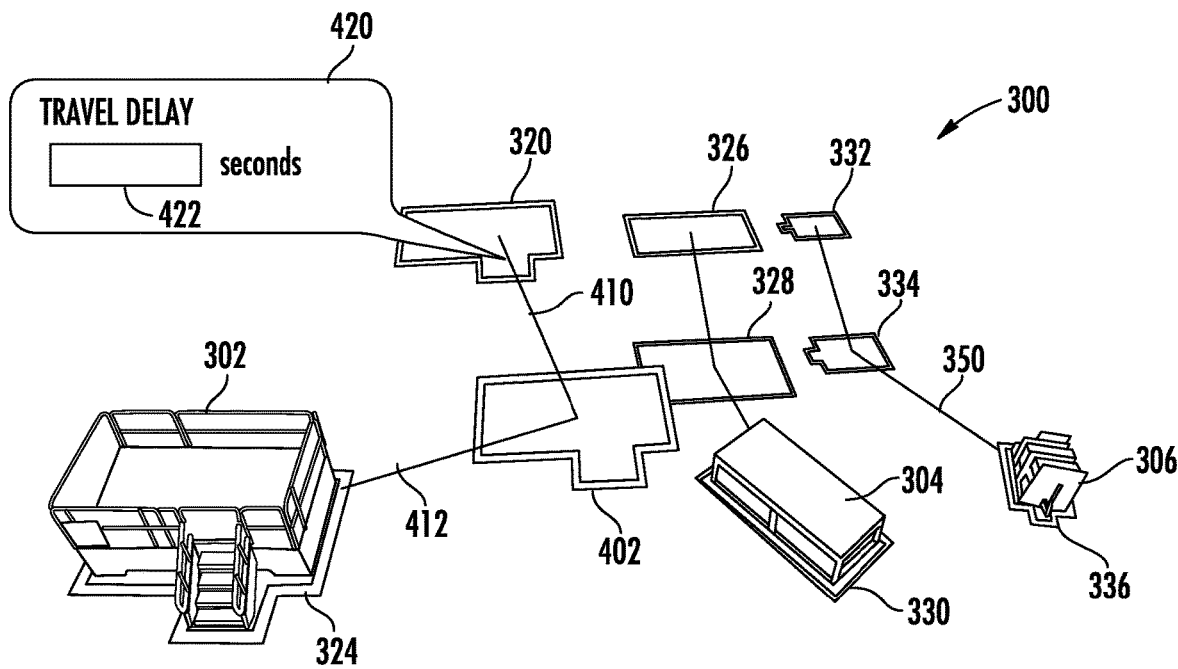
FIG. 4B is a perspective view of the depiction of the an exemplary scenario in the three-dimensional virtual environment 4A, wherein the certain ones of the plurality of objects have moved from initial positions in accordance with the initial facility layout concept to first positions and then second positions, based on a second baseline input data set, wherein two of the objects would occupy the same space at the same time, and wherein the depiction includes a dialog box enables a user to enter user selections for a modified input data set to resolve the space conflict.

FIGS. 4A-4B illustrate an example of how a stakeholder could generate a modified input data set in the event of a conflict detected by the geometric flow analysis application 124 and illustrated by the simulated flow in virtual environment 300. FIG. 4A illustrates an exemplary scenario in which a first intermediate position 402 for the elevated work platform 302 has shifted to the right with respect to the first intermediate position 322 illustrated in FIG. 3B. As a result, the elevated work platform 302 and the worktable 304 partially occupy the same space in the first intermediate position 402 and the second intermediate position 328, respectively. Put differently, the elevated work platform 302 and the worktable 304 collide at the respective intermediate positions. FIG. 4B illustrates a graphical user interface 420 that can be overlaid on the display of the virtual environment 300. The graphical user interface 420 could be overlaid automatically upon detection of the conflict or collision. The graphical user interface 420 points to a first travel path 410 from the first initial position 320 to the shifted first intermediate position 402 for the elevated work platform 302, indicating that modifications entered into the graphical user interface 420 will affect the first travel path 410. In various aspects, a stakeholder could use input device(s) 108, such as a computer mouse, to select different travel paths to be altered by a dialog box. The graphical user interface 420 includes a text box 422 in which a stakeholder could enter a delay time (in seconds) before the elevated work platform 302 begins moving from the first initial position 320 along the first travel path 410. For example, by delaying movement of the elevated work platform 302, the worktable 304 may move from the second intermediate position 328 before the elevated work platform 302 arrives at the shifted first intermediate position 402, thereby eliminating the conflict. Any travel delay entered in the text box 422 is incorporated in the modified input data set 118 used to generate the simulated flow model of the three-dimensional virtual environment and to calculate the estimated time to complete the simulate flow. In various aspects, the geometric flow analysis application 120 and/or the event flow analysis application 120 could automatically populate the text box 422 with a travel delay value that would eliminate the conflict. A stakeholder would be able to change the automatically populated value.

Figure 5A:
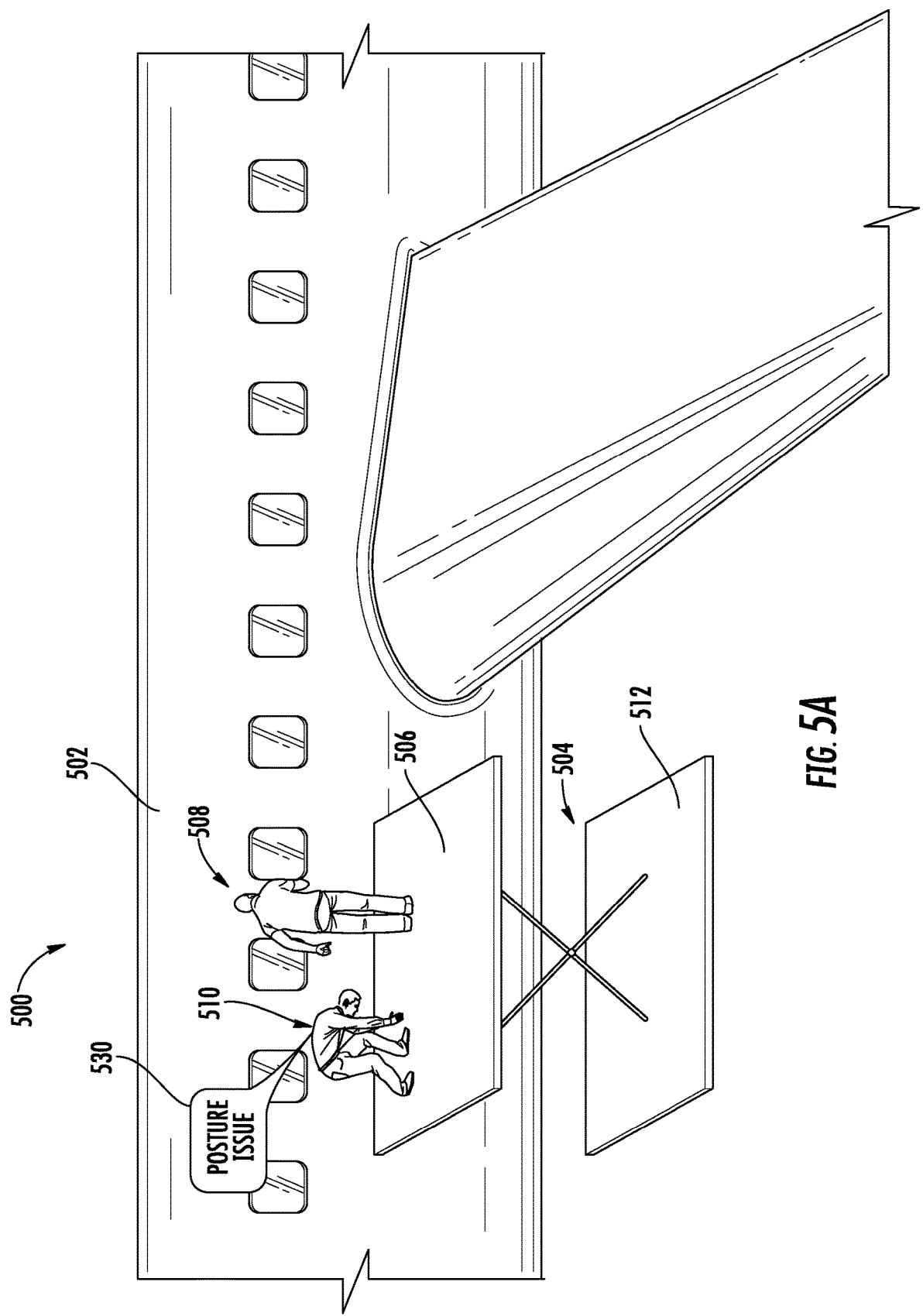
FIG. 5A is a perspective view of a depiction of an exemplary scenario in a three-dimensional virtual environment, based on a baseline input data set, wherein two human objects are depicted on an elevated platform working on an exterior of an aircraft, wherein a first of the two human objects is standing to accomplish a first work task, and wherein a second of the two human objects is crouching to accomplish a second work task.

FIGS. 5A-5E illustrate another exemplary scenario in a three-dimensional virtual environment 500. FIG. 5A illustrates a three-dimensional virtual environment 500 that includes an aircraft fuselage 502 and two human objects 508 and 510 performing tasks on an exterior of the fuselage 502 on elevated work platform 504. The elevated work platform 504 includes a base 512 and an elevated platform 506 that can be raised and lowered relative to the base 512. As shown in FIG. 5A, the elevated platform 506 is raised to a height such that the first human object 508 is assuming a standing posture to perform a task on the exterior of the fuselage 502. In contrast, the second human object 510 is assuming a bent over posture to perform a task on the exterior of the fuselage 502. As discussed above, the ergonomic analysis application 128 could assign a low posture score to the bent over posture of the second human object 510 and could store the low posture score as part of the ergonomic analysis 130. The three-dimensional visual application 132 could automatically overlay a warning flag 530 on the three-dimensional virtual environment 500 (e.g., in response to the stored low posture score) to alert the stakeholder viewing the three-dimensional virtual environment 500 to the posture issue.

Figure 5B:
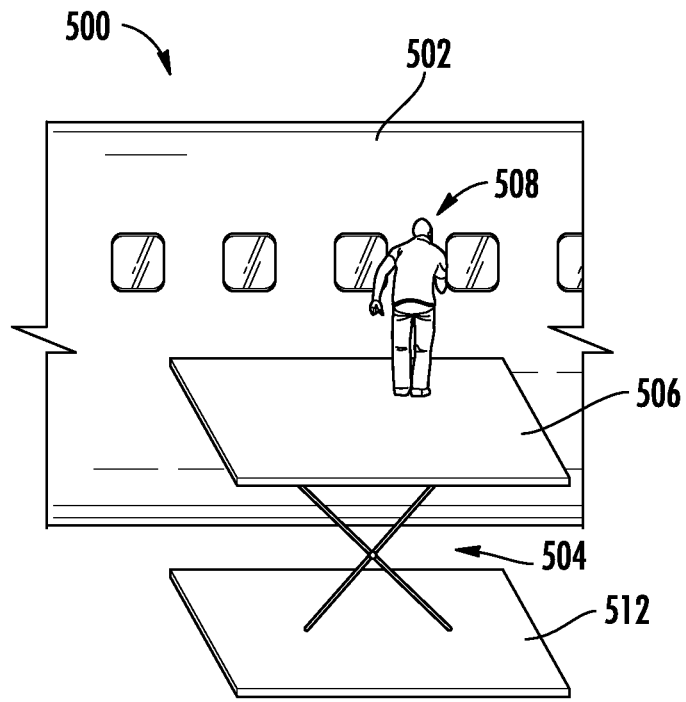
FIG. 5B is a perspective view of a depiction of an alternative exemplary scenario in the three-dimensional virtual environment of FIG. 5A, based on a modified input data set, wherein a single human object is depicted on the elevated platform working on the exterior of the aircraft, and wherein the human object is standing to accomplish the first work task.
Figure 5C:
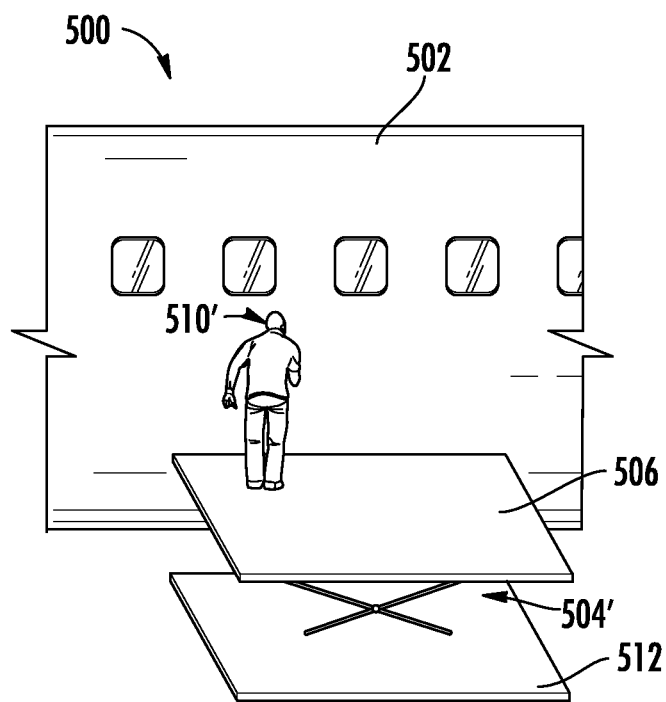
FIG. 5C is a perspective view of a depiction of the alternative exemplary scenario in the three-dimensional virtual environment of FIG. 5B at a later time, based on the modified input data set, wherein a single human object is depicted on the elevated platform working on the exterior of the aircraft, and wherein the elevated platform has been lowered such that the human object is standing to accomplish the second work task.

Referring now to FIGS. 5B and 5C, in response to the posture warning flag 530, a stakeholder could provide a modified input data set (e.g., modified input data set 118) that staggers the tasks being performed by the first human object and the second human object. For example, FIG. 5B illustrates the three-dimensional virtual environment 500 wherein the second human object 510 has been removed from the elevated work platform 504 (via a modified input data set) such that only the first human object 508 is performing a task (in a standing posture) on the elevated work platform 504. At some time after the first human object 508 completes the first task (which may have an expected completion time associated with it in the baseline input data set or the modified data set) the elevated work platform 504 is articulated to a lower elevated position, as shown in FIG. 5C. In FIG. 5C, the second human object 510' is depicted on the elevated platform 506 of the lowered elevated work platform 504'. Because the elevated platform 506 is lower, the second human object 510' is able to assume a standing position to complete the task that formally required the second human object 510 to be bent over.

Figure 5D:
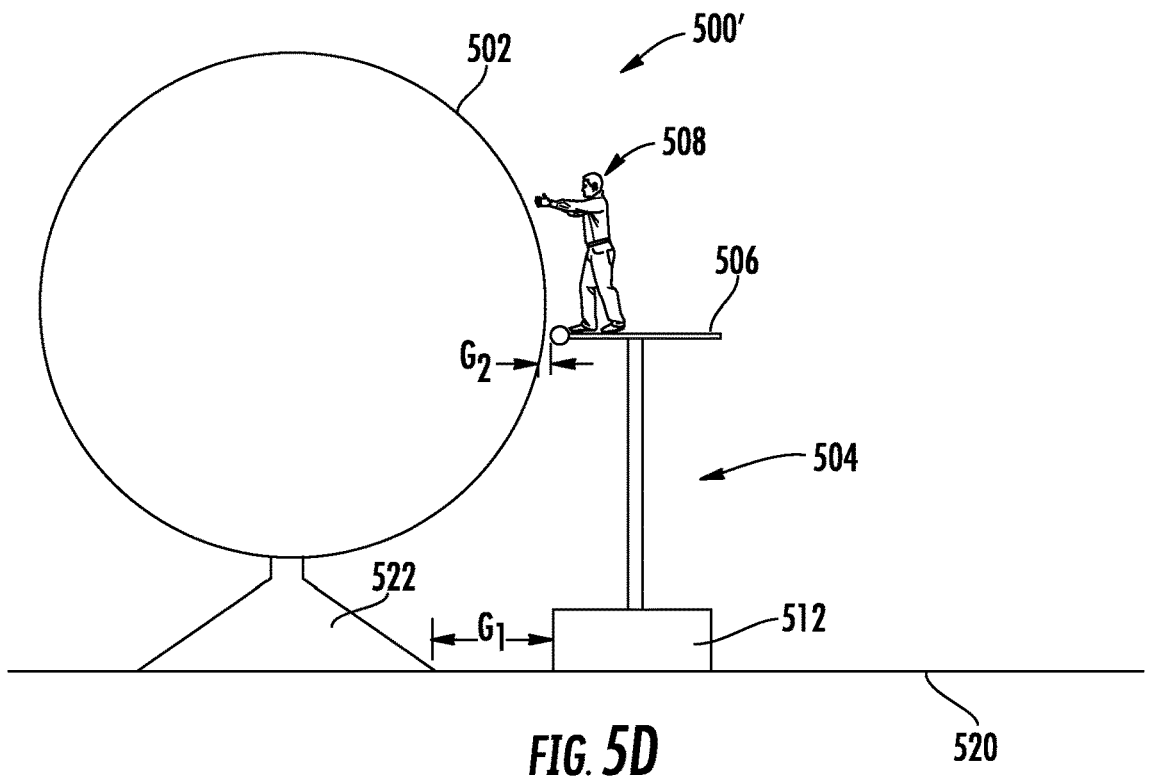
FIG. 5D is a perspective view of the depiction of the alternative exemplary scenario in the three-dimensional virtual environment of FIG. 5B from a second point of view.
Figure 5E:
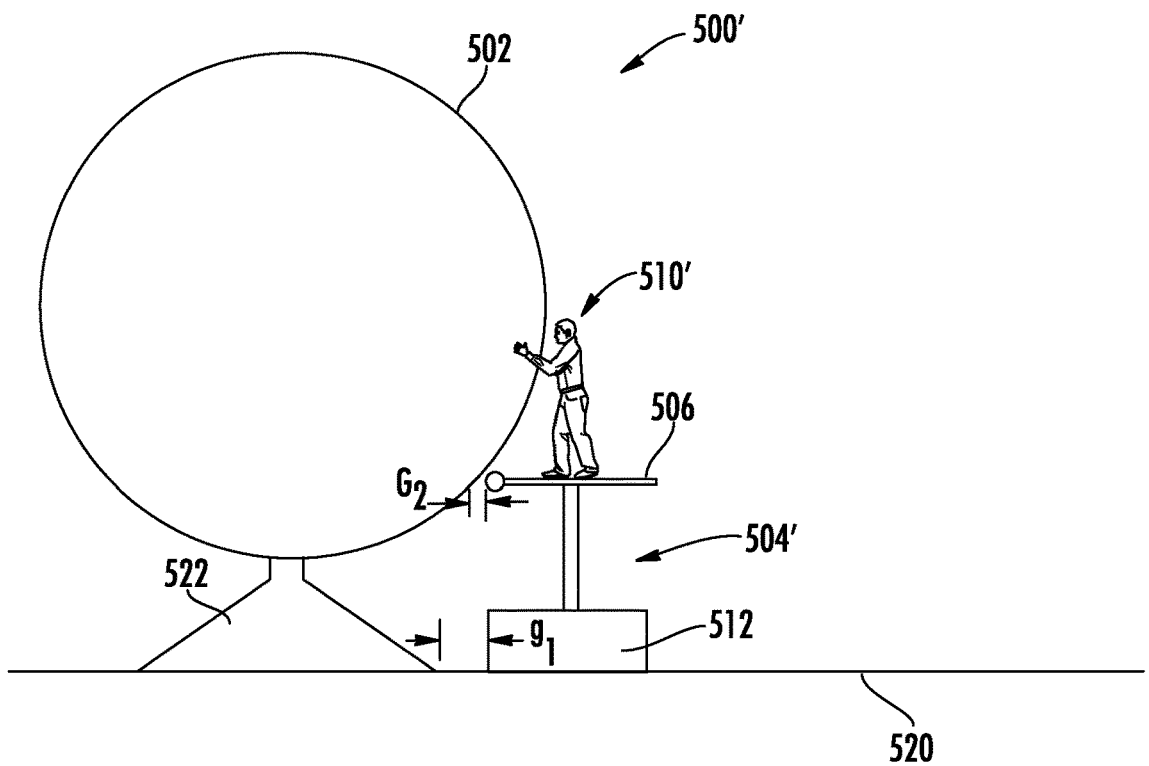
FIG. 5E is a perspective view of the depiction of the alternative exemplary scenario in the three-dimensional virtual environment of FIG. 5C from a second point of view.

As discussed above, in various aspects, the three-dimensional visual application 132 can display the three-dimensional virtual environment 500 from different positions and directions of view within the three-dimensional virtual environment 500. In FIGS. 5A-5C discussed above, a first view of the three-dimensional virtual environment 500 is depicted. FIGS. 5D-5E illustrate the same simulated flow in the three-dimensional virtual environment 500 from a different position and direction of view (as indicated by reference numeral 500'). For example, a stakeholder interested in posture issues related to the human objects 508 and 510 may prefer the view illustrated in FIGS. 5A-5C. By contrast, the stakeholder interested in clearances between different objects may prefer the view illustrated in FIGS. 5D and 5E.

In the view of the three-dimensional virtual environment 500' in FIGS. 5D and 5E, the aircraft fuselage 502 is seen from the front and is supported above the ground 520 by a support stand 522. A particular stakeholder may use this front view of the virtual environment 500' to ensure that the elevated work platform 506 does not touch the aircraft fuselage 502 or the support stand 522. For example, FIG. 5D illustrates the elevated work platform 504 in the same position as shown in FIG. 5B, where in the first human object 508 is performing a task on an exterior surface of the aircraft fuselage 502. As shown in FIG. 5D, the base 512 of the elevated work platform 504 is separated from the support stand 522 by a first gap $G_1$ and the elevated platform 506 is separated from the fuselage 502 by a second gap $G_2$. As shown in FIG. 5E, the base 512 of the lowered elevated work platform 504' may be moved closer to the support stand 522 (to a reduced gap $g_1$) such that the lowered platform 506 is separated from the fuselage 502 by approximately the same gap $G_2$.

In exemplary aspects, a first stakeholder of the computer environment 100 shown in FIG. 1 concerned with ergonomic issues may be viewing a simulated flow in the three-dimensional virtual environment 500 on the display screen 142 of the remote computer 140. The first stakeholder could use the input device(s) 144 of the remote computer 140 to change the position and direction of view of the displayed three-dimensional virtual environment 500 to provide suitable views for examining ergonomic issues of the various human objects in the virtual environment 500. A second stakeholder of the computer environment 100 concerned with spacing issues may be viewing the simulated flow of the three-dimensional virtual environment 500 on the display screen 152 of the remote computer 150. The second stakeholder could use the input device(s) 154 of the remote computer 140 to change the position and direction of view of the displayed three-dimensional virtual environment 500 to provide suitable views for examining spacing issues of the various objects in the virtual environment 500.

In various aspects, the different stakeholders could be viewing the same simulated flow in the three-dimensional virtual environment simultaneously. Put differently, the computer processor 104 of the computer system 102 in FIG. 1 could execute the three-dimensional visual application 132 and output for display the different views of the three-dimensional virtual environment based on the positions and directions of view received from the input device(s) 108 of the computer system 102 and/or the input devices 144 and 154 of the remote computers 140 and 150, respectively.

In various aspects, stakeholders interacting with the computer system 102 via the display screen 106 and the input device(s) 108 of the computer system 102 or via remote computers (e.g., the display screen 142 and input device(s) 144 of the remote computer 140 or the display screen 152 and input device(s) 154 of the remote computer 150) can view a simulated flow in the three-dimensional virtual environment based on the initial facility layout concept 114 and the baseline input data set 116. After viewing the simulated flow in the three-dimensional virtual environment, the stakeholders could modify the initial facility layout concept 114 (using the input device(s) 108 in the computer system 102 or the input devices 144 and 154 and the remote computers 140 and 150, respectively) to create the modified facility layout concept 115. Additionally, the stakeholders could modify the baseline input data set 116 to create a modified input data set 118. Thereafter, the stakeholders view a modified simulated flow in the three-dimensional virtual environment based on the modified facility layout concept 115 and the modified input data set 118. By providing such an architecture, the various stakeholders can iteratively address any issues that may arise from the initial facility layout concept 114 and the baseline input data set 116 (e.g., collision risks or ergonomic issues) and any additional issues that may arise from the modified facility layout concept 115 in the modified input data set 118. For example, a simulated flow based on a first modified facility layout concept 115 and/or a first modified input data set 118 may create a conflict or an ergonomic issue that did not exist in a simulated flow based on the initial facility layout concept 114 and/or the baseline input data set 160. A stakeholder may use an input device(s) to create a second modified facility layout concept 115 and or a second modified input data set 118 that corrects the conflict or ergonomic issue. The modified facility layout concept 115 and/or the modified input data set 118 can continue to be modified until all conflicts, ergonomic issues, and any other issues are resolved. A final simulated flow in the virtual environment based on a final modified facility layout concept 115 and/or a final modified input data set 118 after all of the issues have been resolved represents a suitable workflow in the actual facility.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein may take the form of an entirely hardware aspect, an entirely software aspect (including firmware, resident software, micro-code, etc.) or an aspect combining software and hardware aspects that may all generally be referred to herein as a "circuit," "module" or "system."

The aspects described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of at least one aspect, a user may access applications (e.g., at least one of the event flow analysis application 120, the geometric flow analysis application 124, the ergonomic analysis application 128, and the three-dimensional visual application 132) or related data available in the cloud. For example, the event flow analysis application 120 could execute on a computing system in the cloud and output the event flow analysis 122. In such a case, the event flow analysis application 120 could output the event flow analysis 122 and store the output the event flow analysis 122 at a storage location in the cloud. Doing so allows a user to access this information from any computing system attached to a network connected to the cloud (e.g., the Internet).

While the foregoing is directed to certain aspects, other and further aspects may be devised without departing from the basic scope thereof, and the scope thereof is determined by the claims that follow.

What is claimed is:

1. A method for simulating a layout and flow of a manufacturing facility, comprising:
   receiving an initial facility layout concept, wherein the initial facility layout concept includes three-dimensional models of a plurality of objects in a virtual facility model and initial positions of the plurality of objects in the virtual facility model;
   receiving a baseline input data set for the plurality of objects in the manufacturing facility;
   based on the initial facility layout concept and the baseline input data set, performing, using one or more computer processors,
      an ergonomic analysis that outputs human postures and motions resulting from interactions of human objects with other objects from among the plurality of objects according to an ergonomic analysis application;
   generating, using the one or more computer processors, a first simulated flow model for the manufacturing facility based on the initial facility layout concept and the ergonomic analysis;

generating, using the one or more computer processors, a first three-dimensional virtual environment of the first simulated flow model;

generating a plurality of views of the first three-dimensional virtual environment for simultaneous display on a plurality of display screens, each view of the plurality of views representing a different viewing perspective of the first three-dimensional virtual environment; and determining, using the one or more computer processors, that the first simulated flow model for the manufacturing facility is not satisfactory based on determining that a result of the first simulated flow model relating to the manufacturing facility exceeds a threshold value relating to a posture of a human object in the first simulated flow model, and in response:

automatically, using the one or more computer processors, modifying a height of an object in the baseline input data set, related to the posture of the human object, to generate a modified input data set;

generating, using the one or more computer processors, a second simulated flow model for the manufacturing facility based, at least in part, on the modified input data set, wherein the posture of the human object changes for the second simulated flow model relative to the first simulated flow model;

generating, using the one or more computer processors, a second three-dimensional virtual environment of the second simulated flow model; and altering at least one of a physical layout and flow of the manufacturing facility based on the second simulated flow model.

2. The method of claim 1, further comprising:

receiving a point of view input from an input device indicating a location and direction of view, wherein generating the plurality of views of the first three-dimensional virtual environment comprises generating a first view representing a perspective at the indicated location and direction of view; and receiving a second point of view input from an input device indicating a second location and a second direction of view, wherein generating the plurality of views of the first three-dimensional virtual environment further comprises generating a second view representing a second perspective at the indicated second location and second direction of view on a second display screen, wherein the first view and the second view are suitable for simultaneous display on a first display screen and a second display screen.

3. The method of claim 1, further comprising: based on the modified input data set, performing a modified ergonomic analysis that outputs human postures and motions resulting from interactions of the human objects with the other objects from among the plurality of objects according to the ergonomic analysis application, wherein the second simulated flow model for the manufacturing facility is based on the initial facility layout concept and the modified ergonomic analysis; and displaying the second three-dimensional virtual environment on a computer display screen.

4. The method of claim 3, wherein the modified input data set is further based on a received user selection.

5. The method of claim 1, further comprising:

performing, based on the initial facility layout concept and the baseline input data set and using the one or more computer processors:

an event flow analysis that outputs timing for movement of the plurality of objects from the initial positions according to an event flow analysis application, wherein the event flow analysis generates timing for movement of the plurality of objects based on times for movement and speeds for movement from the baseline input data set.

6. The method of claim 1, further comprising:

performing, based on the initial facility layout concept and the baseline input data set and using the one or more computer processors:

a geometric flow analysis that outputs interactions between the plurality of objects resulting from the movements from the initial positions according to a geometric flow analysis application, wherein the geometric flow analysis generates interactions between the plurality of objects based on three-dimensional boundaries of the plurality of objects.

7. The method of claim 1, further comprising:

performing, based on the initial facility layout concept and the baseline input data set and using the one or more computer processors:

a geometric flow analysis that outputs interactions between the plurality of objects resulting from the movements from the initial positions according to a geometric flow analysis application, wherein the geometric flow analysis generates interactions between the plurality of objects based on articulation models of the plurality of objects.

8. The method of claim 1, wherein the ergonomic analysis generates human postures and motions based on positions of human objects among the plurality of objects and locations of work pieces.

9. The method of claim 1, further comprising:

determining, automatically using the one or more computer processors, an ergonomic score related to human postures and motions in the first simulated flow model, wherein the result that exceeds the threshold value is the ergonomic score, and wherein automatically modifying the baseline input data set to generate a modified input data set comprises modifying the baseline input data set to improve the result that exceeds the threshold value.

10. The method of claim 1, further comprising:

generating an interactive user interface for overlay over a first view of the plurality of views;

modifying the first view to display the interactive user interface;

receiving user input through the interactive user interface; and modifying at least one of the initial facility layout concept or the baseline input data set based on the received user input.

11. The method of claim 10, wherein generating the interactive user interface for overlay over the first view of the plurality of views further comprises:

identifying a parameter relating to at least one of the initial facility layout concept or the baseline input data set; and determining a value for the parameter and automatically populating the interactive user interface with the determined value for the parameter, wherein the received user input relates to the parameter.

12. The method of claim 5, wherein the event flow analysis is performed using the one or more computer processors, and wherein performing the event flow analysis comprises:

determining an estimated length of time for an event flow, and determining a confidence interval for the estimated length of time.

13. A computer program product for simulating a layout and flow of a manufacturing facility, the computer program product comprising:
a computer-readable storage medium having computer-readable program code embodied therewith, the computer-readable program code executable by one or more computer processors to:
receive an initial facility layout concept, wherein the initial facility layout concept includes three-dimensional models of a plurality of objects in a virtual facility model and initial positions of the plurality of objects in the virtual facility model;
receive a baseline input data set for the plurality of objects in the virtual facility model;
based on at least one of the initial facility layout concept and the baseline input data set, perform
an ergonomic analysis that outputs human postures and motions resulting from interactions of human objects with other objects from among the plurality of objects according to an ergonomic analysis application;
generate a first simulated flow model for the manufacturing facility based on the initial facility layout concept and the ergonomic analysis;
generate a first three-dimensional virtual environment of the first simulated flow model;
generate a plurality of views of the first three-dimensional virtual environment for simultaneous display on a plurality of display screens, each view of the plurality of views representing a different viewing perspective of the first three-dimensional virtual environment;
and
determine that the first simulated flow model for the manufacturing facility is not satisfactory based on determining that a result of the first simulated flow model relating to the manufacturing facility exceeds a threshold value relating to a posture of a human object in the first simulated flow model, and in response:
automatically modify a height of an object in the baseline input data set, related to the posture of the human object, to generate a modified input data set;
generate a second simulated flow model for the manufacturing facility based, at least in part, on the modified input data set, wherein the posture of the human object changes for the second simulated flow model relative to the first simulated flow model; and
generate a second three-dimensional virtual environment of the second simulated flow model, wherein at least one of the layout and flow of the manufacturing facility is altered based on the second simulated flow model.

14. The computer program product of claim 13, wherein the computer-readable program code is further executable to:
receive a point of view input from an input device indicating a location and direction of view, wherein generating the plurality of views of the first three-dimensional virtual environment comprises generating a first view representing a perspective at the indicated location and direction of view; and receive a second point of view input from an input device indicating a second location and a second direction of view, wherein generating the plurality of views of the first three-dimensional virtual environment further comprises generating a second view representing a second perspective at the indicated second location and second direction of view on a second display screen, wherein the first view and the second view are suitable for simultaneous display on a first display screen and a second display screen.

15. The computer program product of claim 13, wherein the computer-readable program code is further executable to:
based on the modified input data set, perform
a modified ergonomic analysis that outputs human postures and motions resulting from interactions of the human objects with the other objects from among the plurality of objects according to the ergonomic analysis application,
wherein the second simulated flow model for the manufacturing facility is based on the initial facility layout concept and the modified ergonomic analysis; and
display the second three-dimensional virtual environment on a computer display screen.

16. The computer program product of claim 15, wherein the modified input data set is further based on a received user selection.

17. A system, comprising:
a computer processor;
a display screen; and
a computer memory, storing:
an initial facility layout concept relating to a layout and flow of a manufacturing facility, wherein the initial facility layout concept includes three-dimensional models of a plurality of objects in a virtual facility model and initial positions of the plurality of objects in the virtual facility model;
a baseline input data set for the plurality of objects in the virtual facility model;
an ergonomic analysis application that, when executed by the computer processor, outputs an ergonomic analysis that includes human postures and motions resulting from interactions of human objects with other objects from among the plurality of objects; and
a three-dimensional visual application that, when executed by the computer processor:
generates a first simulated flow model for a manufacturing facility based on the initial facility layout concept and an ergonomic analysis;
generates a plurality of views of a first three-dimensional virtual environment of the first simulated flow model for simultaneous display on a plurality of display screens, each view of the plurality of views representing a different viewing perspective of the first three-dimensional virtual environment; and
determines that the first simulated flow model for the manufacturing facility is not satisfactory based on determining that a result of the first simulated flow model relating to the manufacturing facility exceeds a threshold value relating to a posture of a human object in the first simulated flow model, and in response:

automatically modifies a height of an object in the baseline input data set, related to the posture of the human object, to generate a modified input data set;

generates a second simulated flow model for the manufacturing facility based, at least in part, on the modified input data set, wherein the posture of the human object changes for the second simulated flow model relative to the first simulated flow model; and generates a second three-dimensional virtual environment of the second simulated flow model, wherein at least one of the layout and flow of the manufacturing facility is altered based on the second simulated flow model.

18. The system of claim 17, wherein the ergonomic analysis application is further executable to output a modified ergonomic analysis that outputs human postures and motions resulting from interactions of the human objects with the other objects from among the plurality of objects based on the modified input data set;

wherein the second simulated flow model for the manufacturing facility is based on the initial facility layout concept and the modified ergonomic analysis; and wherein the three-dimensional visual application is further executable to output for display the second three-dimensional virtual environment of the second simulated flow model.

19. The system of claim 17, further comprising a network adapter operable to communicate with a first remote computer and a second remote computer, wherein the first remote computer includes a display screen and an input device operable to receive a first selection of a location and direction of view within the first three-dimensional virtual environment, wherein the second remote computer includes a second display screen and a second input device operable to receive a second selection of a second location and direction of view within the first three-dimensional virtual environment wherein generating the plurality of views of the first three-dimensional virtual environment comprises:

generating a first view representing a perspective at the first selected location and direction of view; and generating a second view representing a second perspective at the second selected location and direction of view, and wherein the computer processor is configured to transmit the first view to the first remote computer and the second view to the second computer using the network adapter.

20. The system of claim 19, wherein the input device is further operable to receive a user input for the modified input data set;

wherein the ergonomic analysis application is further executable to output a modified ergonomic analysis that outputs human postures and motions resulting from interactions of the human objects with the other objects from among the plurality of objects based on the modified input data set; and wherein the second simulated flow model for the manufacturing facility is based on the initial facility layout concept and the modified ergonomic analysis; and wherein the three-dimensional visual application is further executable to output for display the second three-dimensional virtual environment of the second simulated flow model.

* * * * *